(12) United States Patent
Wendt et al.

(10) Patent No.: US 8,836,527 B2
(45) Date of Patent: Sep. 16, 2014

(54) AUTOMOTIVE VEHICLE WITH SYSTEM FOR DETECTING THE PROXIMITY OF AN OCCUPANT

(75) Inventors: Christoph Wendt, Trier (DE); Andreas Petereit, Schweich (DE)

(73) Assignee: IEE International Electronics & Engineering S.A., Luxembourg (LU)

( * ) Notice: Subject to any disclaimer, the term of this patent is extended or adjusted under 35 U.S.C. 154(b) by 693 days.

(21) Appl. No.: 12/595,117

(22) PCT Filed: Apr. 10, 2008

(86) PCT No.: PCT/EP2008/054325
§ 371 (c)(1),
(2), (4) Date: Mar. 31, 2010

(87) PCT Pub. No.: WO2008/122659
PCT Pub. Date: Oct. 16, 2008

(65) Prior Publication Data
US 2010/0188242 A1    Jul. 29, 2010

(30) Foreign Application Priority Data
Apr. 10, 2007  (EP) .................................. 07105876

(51) Int. Cl.
| G08B 21/00 | (2006.01) |
| G06F 3/041 | (2006.01) |
| B60K 28/00 | (2006.01) |
| B60N 2/00 | (2006.01) |
| B60R 21/015 | (2006.01) |

(52) U.S. Cl.
CPC ....... *B60N 2/002* (2013.01); *B60R 2021/01529* (2013.01)
USPC ............................ 340/667; 345/173; 180/273

(58) Field of Classification Search
CPC .................. B60R 2021/01529; B60R 21/015; B60R 25/2027; B60N 2/002; B60K 2350/901; B60K 2350/903; H04B 13/005
USPC .................................. 345/173; 180/272–274
See application file for complete search history.

(56) References Cited

U.S. PATENT DOCUMENTS

| 6,275,146 B1 * | 8/2001 | Kithil et al. ................. 340/425.5 |
| 7,009,488 B2 * | 3/2006 | Schwartz et al. .............. 340/5.2 |
| 7,135,983 B2 * | 11/2006 | Filippov et al. ............... 340/667 |
| 7,194,346 B2 | 3/2007 | Griffin et al. |
| 7,656,169 B2 * | 2/2010 | Scheckenbach et al. ...... 324/679 |
| 7,701,338 B2 * | 4/2010 | Kamizono et al. ............ 340/561 |
| 7,969,423 B2 * | 6/2011 | Kawabe ......................... 345/173 |
| 8,665,077 B2 * | 3/2014 | Richter et al. .............. 340/425.5 |
| 8,704,651 B2 * | 4/2014 | Nix et al. ....................... 340/438 |
| 2004/0056758 A1 | 3/2004 | Schwartz |
| 2005/0253712 A1 * | 11/2005 | Kimura et al. ................ 340/562 |
| 2007/0029768 A1 * | 2/2007 | Clos et al. ..................... 280/735 |
| 2008/0142352 A1 * | 6/2008 | Wright .......................... 200/600 |
| 2008/0186282 A1 * | 8/2008 | Nix et al. ....................... 345/173 |
| 2009/0225036 A1 * | 9/2009 | Wright .......................... 345/173 |
| 2009/0303025 A1 * | 12/2009 | Wahlstrom .................... 340/429 |

FOREIGN PATENT DOCUMENTS

| EP | 1457991 A2 | 9/2004 |
| GB | 2319997 | 6/1998 |

OTHER PUBLICATIONS

International Search Report PCT/EP2008/054325; Dated Sep. 18, 2008.

\* cited by examiner

*Primary Examiner* — Benjamin C Lee
*Assistant Examiner* — Adam Carlson
(74) *Attorney, Agent, or Firm* — Cantor Colburn LLP

(57) ABSTRACT

An automotive vehicle has arranged therein a vehicle seat and is equipped with an occupant detection system for detecting whether an occupant is present on the vehicle seat, the system including a first antenna electrode arranged in the seat and a first sensing circuit associated with the seat, where the first sensing circuit includes an oscillation circuit operatively connected to the first antenna electrode for applying to the first antenna electrode a first oscillating signal and a first current detection circuit connected to the first antenna electrode for determining a current flowing into the first antenna electrode in response to the first oscillating signal being applied thereto, where the current flowing in the first antenna electrode indicates whether an occupant is present on the vehicle seat, and when in operation, the first sensing circuit codes the information whether an occupant is present on the vehicle seat into a first output signal which is output and which may be supplied to a restraint system control unit, the vehicle being further equipped with an appliance including an appliance control device arranged in the vehicle compartment at a location where an occupant of the seat can interact with it, a second antenna electrode is arranged with the appliance control device and a second sensing circuit is associated therewith, where the second sensing circuit is separate from the first sensing circuit and includes an electric signal detection circuit connected to the second antenna electrode and configured for determining an electric signal induced in the second antenna electrode in response to an electric field, which is radiated from an antenna electrode in the vehicle seat, being capacitively coupled into the second antenna electrode, the electric signal induced in the second antenna electrode indicates whether an occupant of the vehicle seat has a part of their body proximate to the appliance control device, and, when in operation, the second sensing circuit codes the information whether an occupant of the vehicle seat has a part of their body proximate to the appliance control device into a second output signal and outputs the second output signal.

14 Claims, 5 Drawing Sheets

AUTOMOTIVE VEHICLE WITH SYSTEM FOR DETECTING THE PROXIMITY OF AN OCCUPANT

TECHNICAL FIELD OF THE INVENTION

The present invention generally relates to automotive occupancy sensor systems for determining the presence of an object or a passenger in a seat, in order to provide an occupancy state signal or condition signal, e.g. for use with a safety restraint system control. The present invention more particularly relates to a capacitive seat occupancy detection system.

BRIEF DISCUSSION OF RELATED ART

Capacitive occupant detection systems are conventionally used in automotive vehicles to provide an occupant protection system with information concerning the occupancy state of one or more vehicle seats. Such information may include a simple indication whether a seat occupant is present or not. More sophisticated systems additionally provide an indication of occupant class. Based upon information provided by the occupant detection system, the occupant protection system can take appropriate measures in case of a collision. A capacitive occupant detection system is described, for instance, in European patent application EP 1 457 391 A1. The system comprises a capacitive seat electrode and a capacitive foot-area electrode arranged in a compartment of the vehicle. During operation, capacitive coupling between the seat electrode and an object placed on the seat is determined, as well as capacitive coupling between the foot-area electrode and the seat electrode. The seat electrode comprises a shielding electrode (guard electrode), directed towards the seat frame, and a sensing electrode, directed towards the occupant of the seat. An insulating layer is arranged between the sensing electrode and the shielding electrode. In operation, the shielding electrode and the sensing electrode are driven by the same signal, so that the guard electrode prevents the electric field from the sensing electrode to couple with the seat frame. Thus the sensing electrode is active only in the direction of a seat occupant and not towards an object placed below the seat.

It has been suggested to use capacitive occupant detection systems to enhance the operability of appliances in a car compartment. US 2005/0038586 A1 discloses a system including a plurality of transmitters arranged in the seats of a vehicle and a receiver integrated into the control device of an electrical appliance (such as the HVAC device or an infotainment system). Powered from a common microcontroller, each transmitter develops and radiates a place-specific radio frequency signal. The receiver integrated into the control device is designed such that the signals transmitted from the transmitters are only weakly received unless the respective occupant places his or her hand near the control device in an attempt to adjust the settings thereof. The output of the receiver is coupled to the microcontroller, which identifies the received signal to determine which of the occupants is attempting to interact with the control device. Depending on who is attempting to interact with the control device, its functionality may be adjusted to the detected occupant. If the received signal is that of the driver, for instance, minimum distraction functionality may be enabled; on the other hand, if the received signal is that of the front passenger transmitter, expanded capability, communication and customization control functions may be enabled.

BRIEF SUMMARY OF THE INVENTION

The invention provides an improved capacitive detection system enhancing the operability of an appliance in automotive environment.

An automotive vehicle has arranged therein a vehicle seat and is equipped with an occupant detection system for detecting whether an occupant is present on the vehicle seat. The occupant detection system includes a first antenna electrode arranged in the seat and a first sensing circuit associated with the seat. The first sensing circuit includes an oscillation circuit operatively connected to the first antenna electrode for applying to the first antenna electrode a first oscillating signal and a first current detection circuit connected to the first antenna electrode for determining a current flowing into the first antenna electrode in response to the first oscillating signal being applied thereto. The current flowing in the first antenna electrode indicates whether an occupant is present on the vehicle seat. When in operation, the first sensing circuit codes the information whether an occupant is present on the vehicle seat into a first output signal which is output and which may be supplied to a restraint system control unit (controlling, for instance, the deployment of one or more airbags and/or the tensioning of a seat belt, etc., in the event of an accident). The vehicle is further equipped with an appliance (e.g. a radio, a car navigation system, an HVAC, an infotainment system, or the like) including an appliance control device (such as, for instance, a button, a knob, a touch screen, a joystick, a slider, a control panel, etc.) arranged in the vehicle compartment at a location where an occupant of the seat can interact with it. According to an important aspect of the invention, a second antenna electrode is arranged with (e.g. in, on or adjacent to) the appliance control device, and a second sensing circuit is associated with, possibly arranged in, the appliance control device. As will be appreciated, the second sensing circuit is separate from the first sensing circuit, in the sense that the second sensing circuit does not operate under the control of the first sensing circuit or under the control of a control unit common to the first and second sensing circuits. In particular, the first and the second sensing circuits need not be synchronised. The second sensing circuit includes an electric signal detection circuit connected to the second antenna electrode and configured for determining an electric signal (current or voltage) induced in the second antenna electrode in response to an electric field, which is radiated from an antenna electrode in the vehicle seat, being capacitively coupled into the second antenna electrode. Those skilled will appreciate that the electric signal induced in the second antenna electrode indicates whether an occupant of the vehicle seat has a part of their body proximate to the appliance control device. When in operation, the second sensing circuit codes the information whether an occupant of the vehicle seat has a part of their body proximate to the appliance control device into a second output signal and outputs the second output signal. The second output signal can be fed to the appliance, which may adapt its behaviour in response to the information contained in the output signal.

As will be appreciated, the system may use, in the vehicle seat, the same electronics as the system disclosed in EP 1 457 391 A1. An important advantage of the present invention with respect to the disclosure of US 2005/0038586 A1 is that the second sensing circuit is separate from the first sensing circuit. Accordingly, the present system can be implemented more easily during assembly of the vehicle. The present invention further provides for a separation of the safety-relevant subsystem (those parts of the system relating to occupant detection) and the subsystem enhancing the functionalities of the appliance, which increase comfort but are not relevant for occupant safety.

Those skilled in the art will note that the electric signal induced in the second antenna electrode is advantageously a current caused to flow in the second electrode in response to the electric field created at an antenna electrode in the vehicle seat. The electric signal detection circuit hence advantageously comprises a second current detection circuit.

It should be noted that the electric signal in the second antenna electrode could be caused by the electric field radiated by the first antenna electrode, when the first sensing circuit attempts to detect an occupant on the seat. Occupant detection might, however, be carried discontinuously, which means that the first oscillating signal is not necessarily applied all the time (when the vehicle electronics are on). Application of the first oscillating signal to the first antenna electrode may, for instance, be interrupted periodically when the occupant sensing system performs a system check. In such event, there would be dead times, during which the second sensing circuit would not be able to detect the proximity of the occupant's hand (or other body part) to the appliance control device. Accordingly, the occupant detection system preferably includes a third antenna operatively connected to the oscillation circuit and arranged in the vehicle seat in such a way as to radiate an electric field into the direction of the region which can be occupied by an occupant on the seat when the oscillation circuit applies a second oscillating signal to the third antenna electrode. The oscillation circuit preferably applies the second oscillating signal continuously, so that there are no dead times in the detection of the occupant's proximity to the appliance control device.

Preferably, the oscillation circuit comprises an oscillator operatively connected to the first antenna electrode and another oscillator operatively connected to the third antenna electrode for applying the first and second oscillating signals, respectively. Alternatively, a single oscillator could be used, which remain continuously be connected to the third antenna electrode so as to apply thereto the second oscillating signal. It should be noted that the first and second oscillating signals could have same frequency, phase and amplitude in those time intervals during which they are both present. Preferably, however, the first oscillator operates at a first frequency and the second oscillator at a second frequency, different from the first frequency. In this case, the first current detection circuit advantageously includes a frequency-selective current meter adapted to the first frequency while the second current detection circuit includes a frequency-selective current meter adapted to the second frequency.

According to a preferred embodiment of the invention, the second current detection circuit includes a current-to-voltage converter connected to the second antenna electrode for converting the current flowing in the second antenna electrode into a voltage, a filter for filtering the voltage, the filter being adapted to the frequency of the electric field capacitively coupled into the second antenna electrode, and a converter connected to the filter configured so as to output a digital signal representing an amplitude of the filtered voltage. The filter could comprise, for instance, a low-pass filter having a slightly higher cut-off frequency than the frequency of the signal to be detected, a high-pass filter having a slightly lower cut-off frequency than the frequency of the signal to be detected or a band-pass filter adapted to the frequency of the signal to be detected.

According to another preferred embodiment of the invention, the second sensing circuit includes an oscillation circuit configured for outputting a clock signal at the frequency of the electric field capacitively coupled into the second antenna electrode and the second current detection circuit includes a clocked rectifier clocked with the clock signal. The clocked rectifier might, for instance, include a current-to-voltage converter connected to the second antenna electrode for converting the current flowing in the second antenna electrode into a voltage, an amplifier circuit operatively connected to the current-to-voltage converter, the amplifier circuit being configured for alternately inverting and non-inverting the voltage, and a low-pass filter for filtering the inverted or non-inverted voltage. The oscillation circuit of the clocked rectifier preferably comprises a phase shifter configured for shifting the phase of the clock signal and the clocked rectifier is preferably configured so that it performs at least two current measurements, between which the phase of the clock signal is shifted, by means of the phase shifter, by a predefined amount different from 180° and multiples thereof.

BRIEF DESCRIPTION OF THE DRAWINGS

Further details and advantages of the present invention will be apparent from the following detailed description of several not limiting embodiments with reference to the attached drawings, wherein.

DETAILED DESCRIPTION OF THE INVENTION

Figure 1:
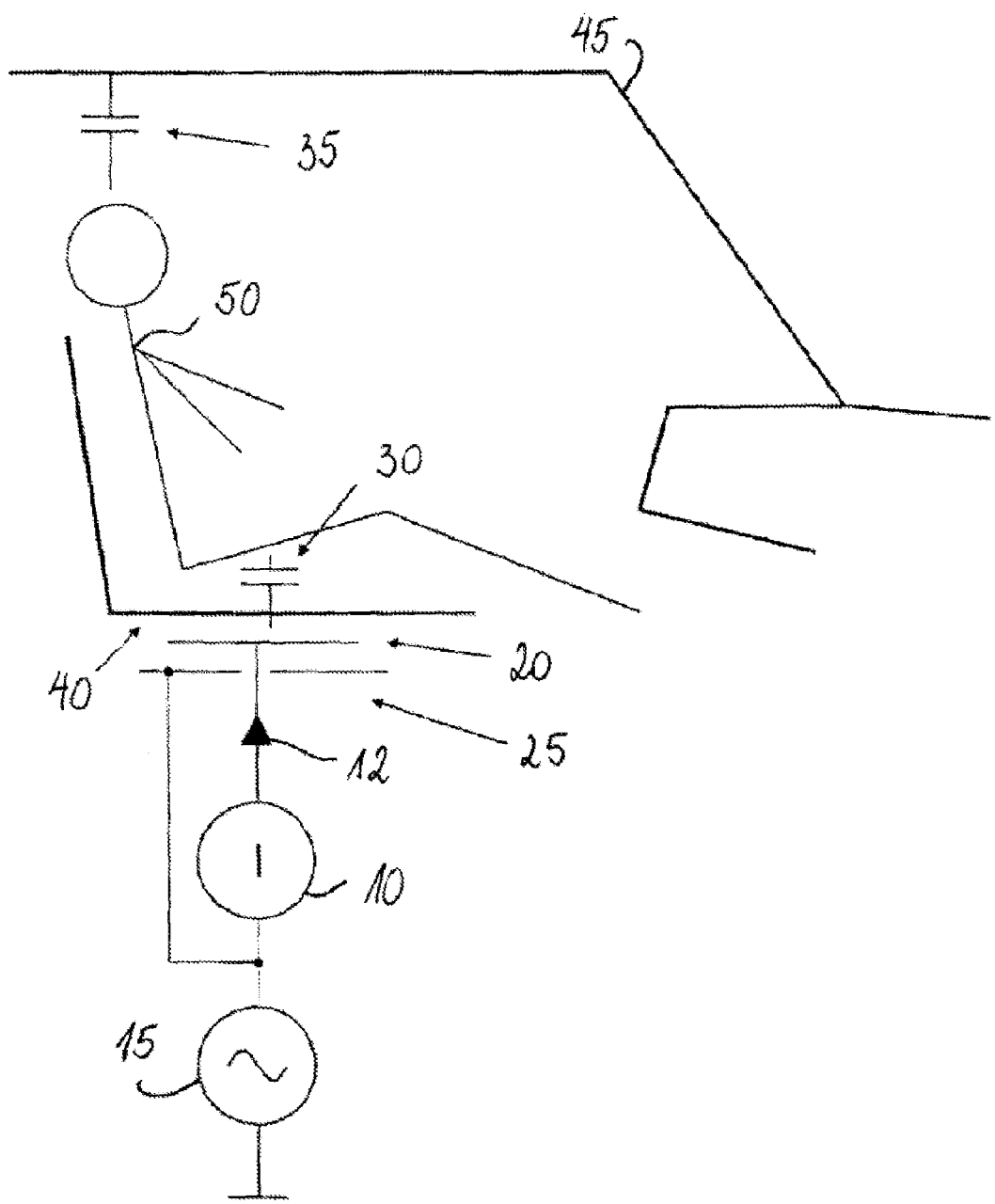
FIG. 1 is a schematic view of a conventional capacitive occupant detection system.

The conventional occupant detection system of FIG. 1 comprises an antenna electrode (sensing electrode) 20 and a shielding electrode (guard electrode) 25 disposed in the seating surface of a vehicle seat 40 and connected to a sensing circuit. The sensing circuit keeps the shielding electrode 25 at substantially the same potential as the sensing electrode 20. Accordingly, the electric field created by the antenna electrode 20 is directed towards the space normally occupied by an occupant 50 of the vehicle seat. The occupant detection system determines the capacitance 30, 35 between the antenna electrode 20 and the car chassis 45. This capacitance depends upon a person or object (occupant 50) on the seat. As a general rule, a large and heavy occupant 50 results in a higher measured capacitance 30, 35.

To determine the capacitance, the sensing circuit comprises an oscillator 15 and a current detection circuit arranged in the vehicle seat 40. The oscillator 15 applies a sine wave voltage having a certain frequency and amplitude to the antenna electrode 20. The current (indicated in the drawing as arrow 12) flowing into the antenna electrode 20 is measured with a first frequency-selective current meter 10. The measured current 12 is proportional to the capacitance; accordingly, the capacitance is determined by the measured current 12. For making the decision of whether an occupant 50 is present, the measured current 12 may be compared to a predefined threshold. The sensing circuit outputs an output signal into which it encodes the determined occupancy state of the vehicle seat 40.

Figure 2:
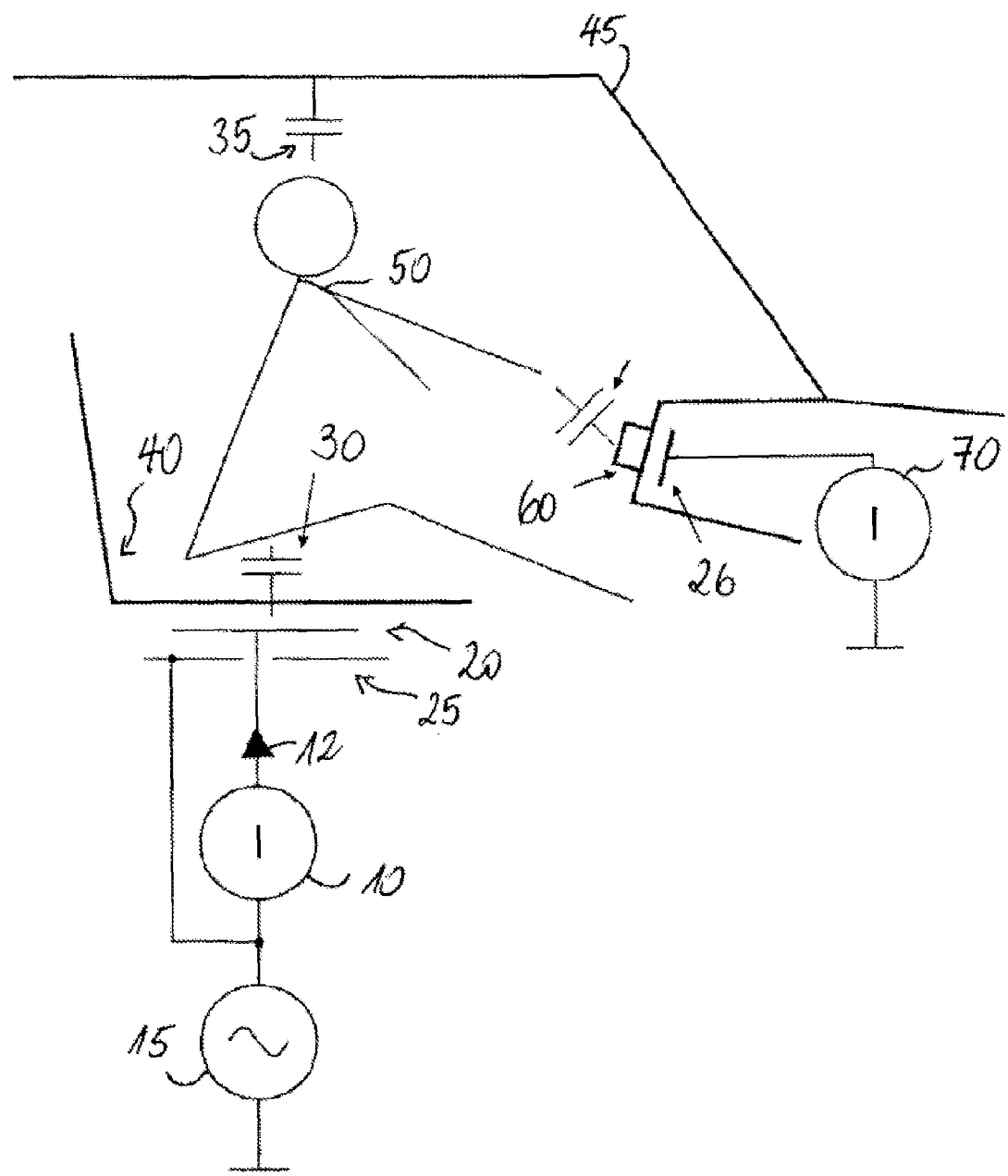
FIG. 2 is a schematic view of a system according to a first preferred embodiment of the invention.
Figure 3:
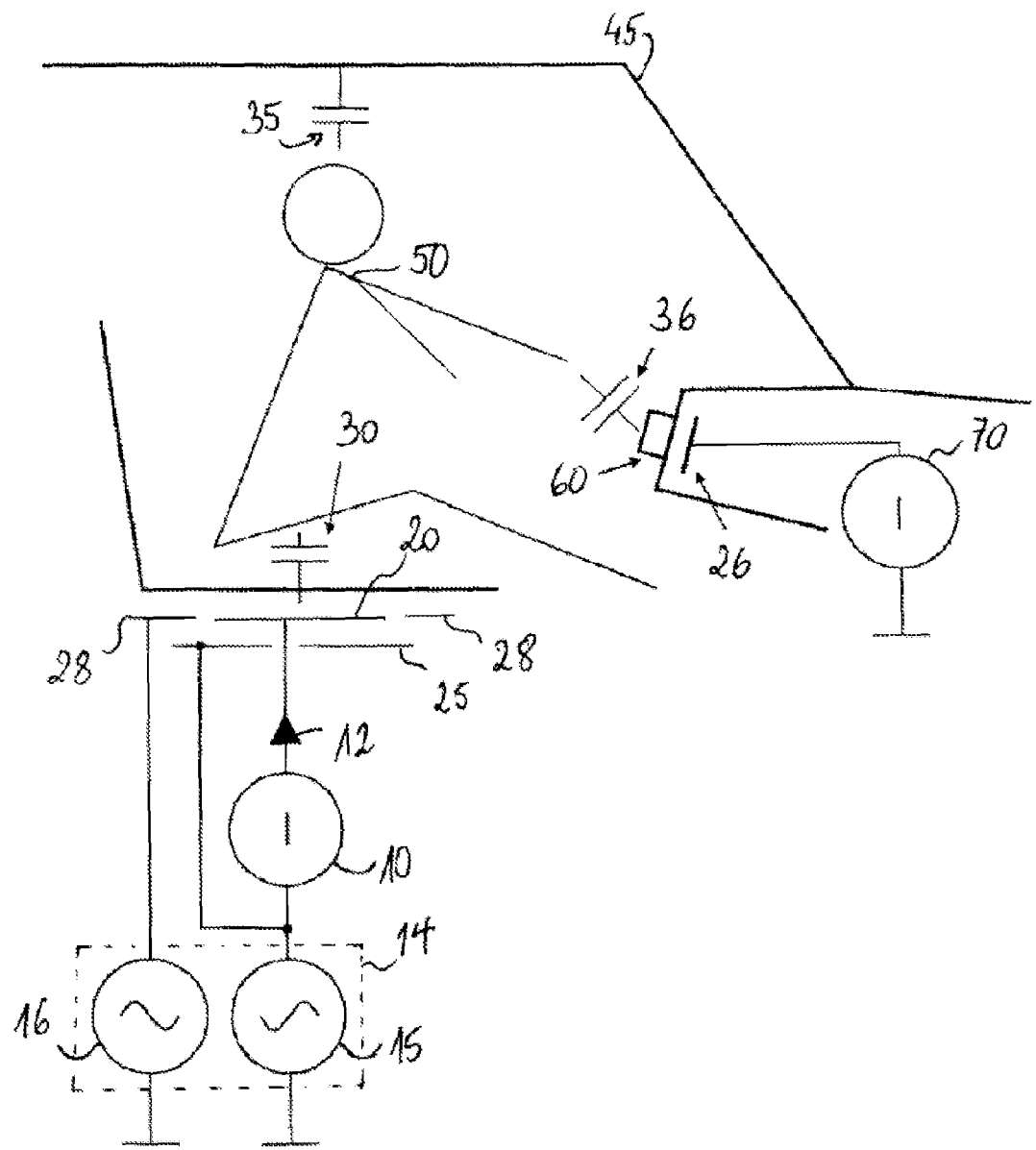
FIG. 3 is a schematic view of a system according to a second preferred embodiment of the invention.

FIGS. 2 and 3 show an occupant detection system according to a first and a second preferred embodiment of the invention, respectively. The systems of FIGS. 2 and 3 have the functionalities of the system of FIG. 1 and are additionally configured for determining whether the occupant 50 of the seat 40 is operating or attempting to operate the control device 60 of a an electrical appliance (such as e.g. a car radio, a navigation system, an HVAC etc.) arranged, for instance in the centre console of the vehicle.

The system of FIG. 2 comprises a second antenna electrode 26 arranged in the appliance control device 60 and a second sensing circuit for detecting whether an occupant 50 of the vehicle seat 40 has a part of their body proximate to the appliance control device 60. When in operation, the second sensing circuit codes this information into a second output signal and outputs said second output signal to the associated appliance. The second sensing circuit includes, in this embodiment, a second frequency-selective current meter 70, adapted to the frequency of oscillator 15, which is, of course, also the frequency of the electric field radiated by the first antenna electrode 20. When an occupant 50 is seated on the seat 40 and if an oscillating signal is applied to the first antenna electrode 20, the second sensing circuit measures the current induced in the second antenna electrode 26. If the occupant 50 has their hand in proximity of the appliance control device 60, the capacitance 30, 36 between the second antenna electrode 26 and the first antenna electrode 20 is increased, which results in an increase induced current. Accordingly, the second sensing circuit may, for instance, determine that an occupant 50 of the seat 40 interacts or attempts to interact with the appliance control device 60 if the current induced exceeds a predefined threshold.

The system of FIG. 3 is in some aspects similar to the system of FIG. 2: it also comprises a second antenna electrode 26 arranged in the appliance control device 60 and a second sensing circuit for detecting whether an occupant 50 of the vehicle seat 40 has a part of their body proximate to the appliance control device 60. When in operation, the second sensing circuit codes this information into a second output signal and outputs said second output signal to the associated appliance. However, the system of FIG. 3 further includes a third antenna electrode, which is arranged in the vehicle seat. The third antenna electrode is connected to the oscillation circuit 14 of the first sensing circuit. The oscillation circuit 14 includes, in this embodiment, a first oscillator 15 and a second oscillator 16. The first oscillator 15, operatively connected to the first antenna electrode 20, supplies a first oscillating signal having a first frequency. The second oscillator 16 is connected to the third antenna electrode, to which it supplies a second oscillating signal having a second frequency, different from the first frequency. In this embodiment, the second sensing circuit includes a second frequency-selective current meter 70, adapted to the frequency of the second oscillator 16, i.e. to the frequency of the electric field radiated from the third antenna electrode 28. If the measurement with the first sensing circuit is interrupted e.g. because a system check is run, the second oscillator 16 continues to apply the second oscillating signal, so that the measurement with the second sensing circuit needs not to be interrupted. Most advantageously, the oscillation circuit 14 is configured for applying a second oscillating signal to the third electrode only if the seat is occupied. If the first sensing circuit is capable of detecting also an occupant class, application of the second signal may be conditional upon the detected occupant classes. For instance, the system may be configured (or configurable by the user) in such a way that the second oscillating signal is only applied if the occupant is classified as an adult.

In both embodiments, if the control device 60 is operated but the occupant detection system does not detect the occupant 50 of seat 40 as doing so, it can be determined that the operating person is someone else. Accordingly, if the system has its first sensing circuit arranged in the front passenger seat, it can determine whether the passenger on the front passenger seat or the driver operates the control device 60. This allows, for instance, blocking certain functionalities for safety reasons if the person who attempts to operate the control device is not authorised. (The non-authorised person could be the passenger or the driver, depending on the functionality.) More generally, any kind of user-dependent behaviour (e.g. for increasing comfort) could be of the appliance or its control device could be governed by the occupant detection system of the present invention. To make the decision whether the occupant is attempting to interact with the control device 60, the current measured in the second antenna electrode 26 in response to the signal being applied to the first antenna electrode 20 may be compared with a predetermined threshold. The capacitive occupant detection system could comprise sensing circuits not only in the passenger seat but also in other seats e.g. the driver seat. In contrast to a system having a sensing circuit in the passenger seat only, such system would enable positive detection of whether the driver interacts with the control device.

FIGS. 4 to 8 show various embodiments of the second current detection circuit 70. Those skilled will appreciate that the second current detection circuit 70 needs not to be synchronised with the oscillator 15 or 16. It should, however, be implemented in such a way that it is substantially insensitive to noise.

Figure 4:
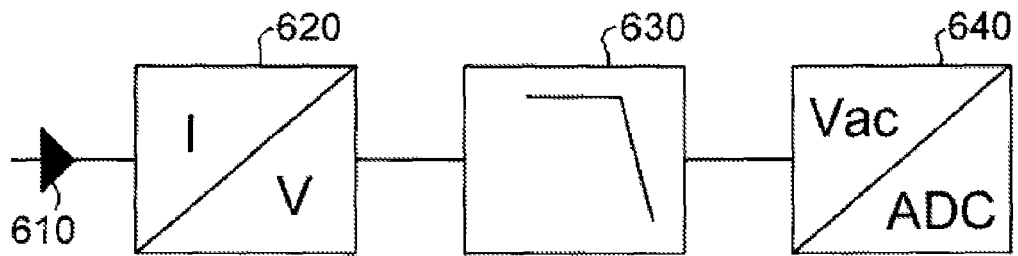
FIGS. 4-8 are different embodiments of a current detection circuit for a sensing circuit associated to an appliance control device.

The second current detection circuit of FIG. 4 comprises a current-to-voltage converter 620, which is connected to the second antenna electrode and which converts the current 610 induced therein by the electric field of the first or third antenna electrodes into an oscillating voltage. This voltage is then filtered with a low-pass filter 630, connected to the current-to-voltage converter 620 and whose cut-off frequency is slightly higher than the frequency of the first oscillator (in the embodiment of FIG. 2) or the second oscillator (in the embodiment of FIG. 3). The filtered voltage is then converted into a digital output signal representing the amplitude of the filtered voltage. This embodiment of the second current detection circuit is suitable if the noise is expected to have a higher frequency than the signal to be measured.

Figure 5:
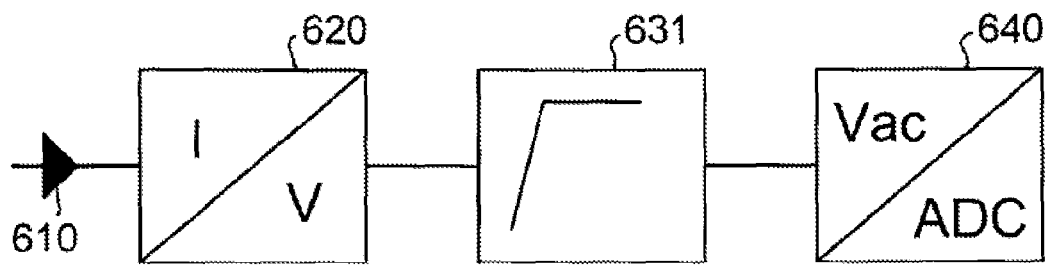

The second current detection circuit of FIG. 5 comprises a current-to-voltage converter 620, which is connected to the second antenna electrode and which converts the current 610 induced therein by the electric field of the first or third antenna electrodes into an oscillating voltage. This voltage is then filtered with a high-pass filter 631, connected to the current-to-voltage converter 620 and whose cut-off frequency is slightly lower than the frequency of the first oscillator (in the embodiment of FIG. 2) or the second oscillator (in the embodiment of FIG. 3). The filtered voltage is then converted into a digital output signal representing the amplitude of the filtered voltage. This embodiment of the second current detection circuit is suitable if the noise is expected to have a lower frequency than the signal to be measured.

Figure 6:
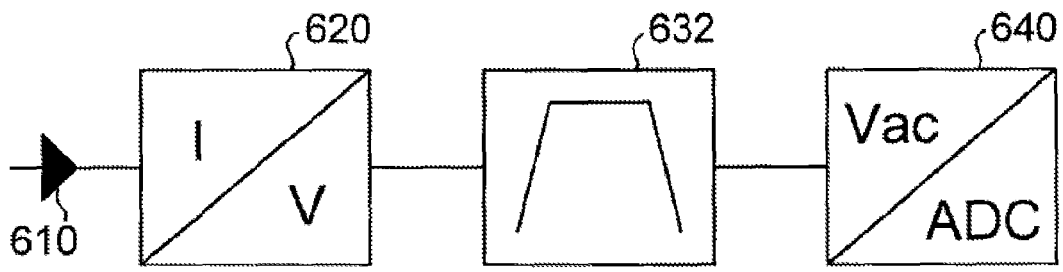

The second current detection circuit of FIG. 6 is suitable if the noise characteristics are not known in advance. The voltage obtained from the current-to-voltage converter comprises a band-pass filter 632 adapted to the frequency of the signal to be measured.

Figure 7:
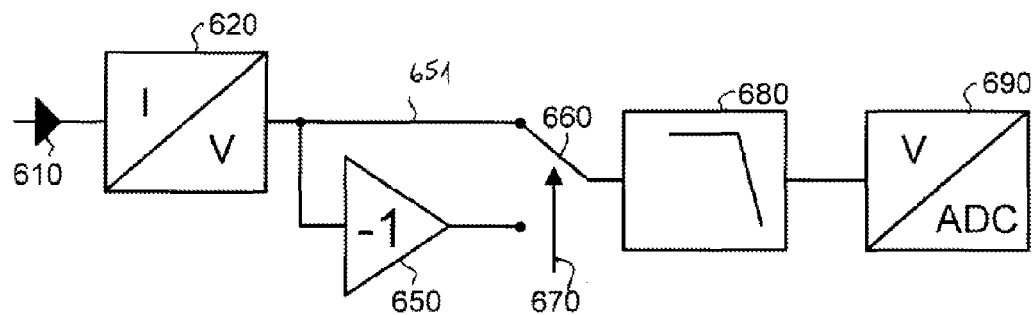

The second current detection circuit shown in FIG. 7 is implemented as a clocked rectifier. The clocked rectifier comprises a current-to-voltage converter 620, connected to the second antenna electrode, an amplifier circuit 650, 651, 660 configured for alternately inverting and non-inverting the voltage obtained from the current-to-voltage converter, a low-pass filter 680 for filtering the output of the amplifier circuit and an analog-to-digital converter converting the low-passed voltage to a digital signal. The amplifier circuit comprises a non-inverting branch 651, an inverting branch 650 and a switch 660, which connects alternatively the inverting or the non-inverting branch to the low-pass filter 680. The switching frequency of the switch 660 is given by control signal (also: clock signal) 670 and is the same as the frequency of the signal to be detected (i.e. the frequency of the first oscillator in the embodiment of FIG. 2 or the second oscillator in the embodiment of FIG. 3). Both switch positions have the same duration. The low-pass filter 680 has a cut-off frequency low enough to eliminate the ripple from the voltage after the switch 660 and low enough to eliminate noise. (The low-pass filter 680 hence provides a time-average of the signal input thereto.) On the other hand, the cut-off frequency is high enough to allow for short measurement times.

The control signal 670 may be provided from an oscillator that is not synchronised to the first or the second oscillator. Accordingly, the phase difference between the current 610 induced in the second antenna electrode and the control signal is unknown. (This phase difference would be known if the first and second sensing circuit were synchronised, which can be done but does not correspond to the way chosen in the embodiments of FIGS. 7 and 8.) The output voltage of the low pass filter 680 hence depends from an unknown phase difference and can be 0 in worst case (for a phase difference of 90°). To measure the amplitude of the current in the second antenna electrode (without synchronising, in advance, the clocked rectifier to the first or the second oscillating signal, respectively), one therefore performs at least two measurements, where the phase of the control signal is changed by a known amount (different of 180° and multiples thereof) between the at least two measurements. Most suitable is a phase difference of 90°. If I1 is the current component measured during a first measurement and if I2 is the current component measured during a second (90°-phase-shifted) measurement, the amplitude I of the current induced in the second antenna electrode is given by:

$$I=\sqrt{I1^2+I2^2}.$$

Figure 8:
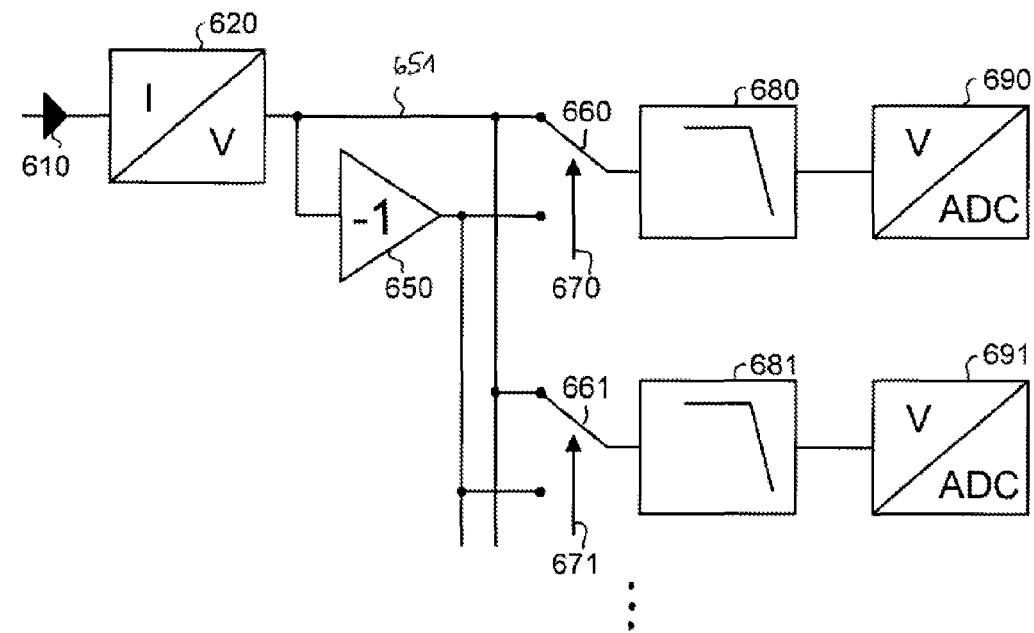

Another embodiment of a clocked rectifier is shown in FIG. 8. In this embodiment, the measurements with different phases of the control signal are carried out in parallel. The non-inverting branch 651 and the inverting branch 650 of the amplifier circuit are connected to at least two switches 660, 661, which are controlled by respective control signals 670, 671. Each switch 660, 661 provides the inverted or non-inverted voltage to a respective low-pass filter 680, 681 and analog-to-digital converter 690, 691. The low-pass amplifiers 680, 681 and analog-to-digital converters 690, 691 have the same configuration as in FIG. 7.

The control signals 670, 671 have the same frequency as the signal to be detected. The phase difference (different from 180° or multiples thereof) between the control signals 670 and 671 is known but a common phase offset with respect to the first oscillating signal (in case of the embodiment of FIG. 2) or the second oscillating signal (in case of the embodiment of FIG. 3) is not known in advance. Each one of the analog-to-digital converters outputs a digital signal indicative of a certain current component. If between the control signals 670, 671 a phase difference of 90° is chosen one can compute the amplitude I of the current induced in the second antenna electrode by combining the digital outputs I1 and I2 of the analog-to-digital converters 690, 691 as $$I=\sqrt{I1^2+I2^2}.$$

If the second sensing circuit includes a clocked rectifier as shown in FIG. 7 or 8, it preferably comprises a computing unit (e.g. a microprocessor or a dedicated digital circuit), which computes the amplitude of the current induced in the second antenna electrode and compares that amplitude to a predefined threshold (or a plurality of thresholds). The outcome of this comparison is then coded into an output signal, which is made available for the appliance.

The invention claimed is:
1. An automotive vehicle comprising
   a vehicle seat,
   an occupant detection system to detect whether an occupant is present on said vehicle seat, said occupant detection system including:
   a first antenna electrode arranged in said seat,
   a first sensing circuit associated with said seat, said first sensing circuit comprising an oscillation circuit operatively connected to said first antenna electrode for applying to said first antenna electrode a first oscillating signal and a first current detection circuit connected to said first antenna electrode for determining a current flowing into said first antenna electrode in response to said first oscillating signal being applied thereto, said current flowing in said first antenna electrode being indicative of whether an occupant is present on said vehicle seat, wherein said first sensing circuit, when in operation, codes the information whether an occupant is present on said vehicle seat into a first output signal and outputs said first output signal,
   a third antenna electrode operatively connected to said oscillation circuit, said third antenna electrode arranged in said vehicle seat and configured to radiate an electric field into the direction of the region configured to be occupied by an occupant on said seat when said oscillation circuit applies a second oscillating signal to said third antenna electrode; and
   an appliance including an appliance control device;
   wherein said vehicle further includes a second antenna electrode arranged with said appliance control device and a second sensing circuit associated with said appliance control device, said second sensing circuit being separate from said first sensing circuit, said second sensing circuit including an electric signal detection circuit connected to said second antenna electrode and configured to determine an electric signal induced in said second antenna electrode in response to an electric field, created by said third antenna electrode, being capacitively coupled into said second antenna electrode, said electric signal induced in said second antenna electrode being indicative of whether an occupant of said vehicle seat has a part of their body proximate to said appliance control device, and wherein said second sensing circuit, when in operation, codes the information whether an occupant of said vehicle seat has a part of their body proximate to said appliance control device into an second output signal and outputs said second output signal; and
   wherein said oscillation circuit is configured to apply said second oscillating signal to said third antenna electrode only when said first sensing circuit has detected an occupant to be present on said vehicle seat, wherein said oscillation circuit is configured to continue to apply said second oscillating signal to said third antenna electrode when measurements with said first sensing circuit are interrupted.

2. The automotive vehicle according to claim 1, wherein said electric signal induced in said second antenna electrode is a current caused to flow in said second electrode in response to an electric field, created at the first antenna electrode in said vehicle seat, and wherein said electric signal detection circuit comprises a second current detection circuit.

3. The automotive vehicle according to claim 1, wherein said oscillation circuit comprises an oscillator operatively connected to said first antenna electrode and another oscillator operatively connected to said third antenna electrode for applying said first and second oscillating signals, respectively.

4. The automotive vehicle according to claim 1, wherein said oscillation circuit comprises an oscillator operatively connected to said first antenna electrode and another oscillator operatively connected to said third antenna electrode for applying said first and second oscillating signals, respectively, and wherein said first oscillator operates at a first frequency, wherein said second oscillator operates at a second frequency, different from the first frequency, wherein said first current detection circuit includes a frequency-selective current meter adapted to said first frequency and wherein said second current detection circuit includes a frequency-selective current meter adapted to said second frequency.

5. The automotive vehicle according to claim 2, wherein said second current detection circuit includes a current-to-voltage converter connected to said second antenna electrode for converting the current flowing in said second antenna electrode into a voltage, a filter for filtering said voltage, said filter being adapted to the frequency of said electric field capacitively coupled into said second antenna electrode, and a converter connected to said filter configured so as to output a digital signal representing an amplitude of said filtered voltage.

6. The automotive vehicle according to claim 2, wherein said second sensing circuit includes an oscillation circuit configured to output a clock signal at the frequency of said electric field capacitively coupled into said second antenna electrode and wherein said second current detection circuit includes a clocked rectifier clocked with said clock signal.

7. The automotive vehicle according to claim 6, wherein said clocked rectifier comprises a current-to-voltage converter connected to said second antenna electrode for converting the current flowing in said second antenna electrode into a voltage, an amplifier circuit operatively connected to the current-to-voltage converter, said amplifier circuit being configured for alternately inverting and non-inverting said voltage, and a low-pass filter for filtering said inverted or non-inverted voltage.

8. The automotive vehicle according to claim 6, wherein the oscillation circuit of said clocked rectifier comprises a phase shifter configured for shifting a phase of said clock signal, and wherein said clocked rectifier is configured for performing at least two measurements, between which the phase of said clock signal is shifted with said phase shifter by a predefined amount different from 180° and multiples thereof.

9. An automotive vehicle comprising
 a vehicle seat,
 an occupant detection system to detect whether an occupant is present on said vehicle seat, said occupant detection system including:
 a first antenna electrode arranged in said seat,
 a first sensing circuit associated with said seat, said first sensing circuit comprising an oscillation circuit operatively connected to said first antenna electrode for applying to said first antenna electrode a first oscillating signal and a first current detection circuit connected to said first antenna electrode for determining a current flowing into said first antenna electrode in response to said first oscillating signal being applied thereto, said current flowing in said first antenna electrode being indicative of whether an occupant is present on said vehicle seat, wherein said first sensing circuit, when in operation, codes the information whether an occupant is present on said vehicle seat into a first output signal and outputs said first output signal,
 a third antenna electrode operatively connected to said oscillation circuit, said third antenna electrode arranged in said vehicle seat and configured to radiate an electric field into the direction of the region configured to be occupied by an occupant on said seat when said oscillation circuit applies a second oscillating signal to said third antenna electrode; and
 an appliance including an appliance control device;
 wherein said vehicle further includes a second antenna electrode arranged with said appliance control device and a second sensing circuit associated with said appliance control device, said second sensing circuit being separate from said first sensing circuit, said second sensing circuit including a second current detection circuit connected to said second antenna electrode and configured to determine an electric current induced in said second antenna electrode in response to an electric field, created by third antenna electrode, being capacitively coupled into said second antenna electrode, said electric current induced in said second antenna electrode being indicative of whether an occupant of said vehicle seat has a part of their body proximate to said appliance control device;
 wherein said second sensing circuit, when in operation, codes the information whether an occupant of said vehicle seat has a part of their body proximate to said appliance control device into an second output signal and outputs said second output signal;
 wherein said second sensing circuit includes an oscillation circuit configured to output a clock signal at the frequency of said electric field capacitively coupled into said second antenna electrode and wherein said second current detection circuit includes a clocked rectifier clocked with said clock signal;
 wherein said oscillation circuit is configured to apply said second oscillating signal to said third antenna electrode only when said first sensing circuit has detected an occupant to be present on said vehicle seat; and
 wherein said oscillation circuit is configured to continue to apply said second oscillating signal to said third antenna electrode when measurements with said first sensing circuit are interrupted.

10. The automotive vehicle according to claim 9, wherein said oscillation circuit comprises an oscillator operatively connected to said first antenna electrode and another oscillator operatively connected to said third antenna electrode for applying said first and second oscillating signals, respectively.

11. The automotive vehicle according to claim 10, wherein said clocked rectifier comprises a current-to-voltage converter connected to said second antenna electrode for converting the current flowing in said second antenna electrode into a voltage, an amplifier circuit operatively connected to the current-to-voltage converter, said amplifier circuit being configured for alternately inverting and non-inverting said voltage, and a low-pass filter for filtering said inverted or non-inverted voltage.

12. The automotive vehicle according to claim 10, wherein the oscillation circuit of said clocked rectifier comprises a phase shifter configured for shifting a phase of said clock signal, and wherein said clocked rectifier is configured for performing at least two measurements, between which the phase of said clock signal is shifted with said phase shifter by a predefined amount different from 180° and multiples thereof.

13. The automotive vehicle according to claim 9, wherein said second current detection circuit includes a current-to-voltage converter connected to said second antenna electrode for converting the current flowing in said second antenna electrode into a voltage, a filter for filtering said voltage, said filter being adapted to the frequency of said electric field capacitively coupled into said second antenna electrode, and a converter connected to said filter configured so as to output a digital signal representing an amplitude of said filtered voltage.

14. An automotive vehicle comprising
a vehicle seat,
an occupant detection system to detect whether an occupant is present on said vehicle seat, said occupant detection system including:
a first antenna electrode arranged in said seat,
a first sensing circuit associated with said seat, said first sensing circuit comprising an oscillation circuit operatively connected to said first antenna electrode for applying to said first antenna electrode a first oscillating signal and a first current detection circuit connected to said first antenna electrode for determining a current flowing into said first antenna electrode in response to said first oscillating signal being applied thereto, said current flowing in said first antenna electrode being indicative of whether an occupant is present on said vehicle seat, wherein said first sensing circuit, when in operation, codes the information whether an occupant is present on said vehicle seat into a first output signal and outputs said first output signal, and
a third antenna electrode, said third antenna electrode being operatively connected to said oscillation circuit, said third antenna arranged in said vehicle seat in such a way as to radiate an electric field into the direction of the region which can be occupied by an occupant on said seat when said oscillation circuit applies a second oscillating signal to said third antenna electrode; and
an appliance including an appliance control device;
wherein said vehicle further includes a second antenna electrode arranged with said appliance control device and a second sensing circuit associated with said appliance control device, said second sensing circuit being separate from said first sensing circuit, said second sensing circuit including an electric signal detection circuit connected to said second antenna electrode and configured to determine an electric signal induced in said second antenna electrode in response to an electric field, created by said third antenna electrode, being capacitively coupled into said second antenna electrode, said electric signal induced in said second antenna electrode being indicative of whether an occupant of said vehicle seat has a part of their body proximate to said appliance control device, and wherein said second sensing circuit, when in operation, codes the information whether an occupant of said vehicle seat has a part of their body proximate to said appliance control device into an second output signal and outputs said second output signal; and
wherein said oscillation circuit is configured to apply said second oscillating signal to said third antenna electrode only when said first sensing circuit has detected an occupant to be present on said vehicle seat, and
wherein said oscillation circuit is configured to continue to apply said second oscillating signal to said third antenna electrode when measurements with said first sensing circuit are interrupted.

* * * * *